United States Patent [19]

Deter et al.

[11] Patent Number: 5,440,352
[45] Date of Patent: Aug. 8, 1995

[54] LASER-DRIVEN TELEVISION PROJECTION SYSTEM WITH ATTENDANT COLOR CORRECTION

[75] Inventors: Christhard Deter; Dirk Loeffler, both of Gera, Germany

[73] Assignee: Schneider Rundfunkwerke Aktiengesellschaft, Tuerkheim, Germany

[21] Appl. No.: 198,484

[22] Filed: Feb. 18, 1994

[30] Foreign Application Priority Data

Mar. 4, 1993 [DE] Germany .................. 43 06 797.2
Dec. 30, 1993 [EP] European Pat. Off. .......... 93121128

[51] Int. Cl.⁶ .................. H04N 9/31; H04N 9/74
[52] U.S. Cl. .................. 348/750; 348/659; 348/649
[58] Field of Search ............. 348/649, 659, 644, 744, 348/781, 750, 267, 31, 81; 313/502, 503, 509, 468; 358/483, 514; 382/6; H04N 9/31, 9/74

[56] References Cited

U.S. PATENT DOCUMENTS

| | | | |
|---|---|---|---|
| 4,910,589 | 3/1990 | Nagano et al. | |
| 4,987,483 | 1/1991 | Tsukagoshi | 358/64 |
| 4,989,079 | 1/1991 | Ito | |
| 5,031,033 | 7/1991 | Tsukagoshi et al. | 358/60 |
| 5,144,417 | 9/1992 | Tsukagoshi et al. | 358/60 |
| 5,200,667 | 4/1993 | Iwasaki et al. | 313/478 |

FOREIGN PATENT DOCUMENTS

| | | |
|---|---|---|
| 1462404 | 2/1966 | Germany . |
| 3435538A1 | 9/1984 | Germany . |
| 4014740A1 | 5/1990 | Germany . |
| WO88/01823 | 3/1988 | WIPO . |

OTHER PUBLICATIONS

Article—"Optimization of Digital Color Reproduction on the Basis of Visual Assessment of Reproduced Images", by Pekka Laihanen, Proceedings of the SID, vol. 30/3, 1989, pp. 183–190.
Article "Farbmetrik und Farbfernsehen", by Heinwig Lang, Munich, R. Oldenbourg Verlag, 1978, pp. 161–172.
Article "Fundamentals of Digital Image Processing", by Anil K. Jain, Englewood Cliffs, N.J., Prentice Hall, 1989, pp. 262–263.
Article "Large Screen Laser Color TV Projector", by Yahiko Yamada et al, from the Proceedings of the 6th International Quantum Electronics Conference, 1970, pp. 242–243.

(List continued on next page.)

*Primary Examiner*—James J. Groody
*Assistant Examiner*—Nina N. West
*Attorney, Agent, or Firm*—McAulay Fisher Nissen Goldberg & Kiel

[57] ABSTRACT

A television projection system for generating picture points of a television picture has at least three light sources which may be controlled in intensity for light signals ($R_L'$, $G_L'$, $B_L'$) of different wavelengths, wherein the hue of each picture point is fixed by means of color value signals (R, G, B) in a first base system which may be represented in a CIE diagram by corner points of a hue region which are defined via wavelengths of screen phosphors. The wavelengths of the light signals determine a second base system which shares a common range of hues with the first base system. Further, an input circuit is provided for generating at least three electrical signals which are proportional to the color value signals (R, G, B) or contain a mixture thereof, and a control device is provided for controlling the light sources. The control device can be triggered by the signals of the input circuit and has a circuit which can transform every hue from the first base system into the second base system via a matrix. In addition, the shortest wavelength of the light sources is 470 nm or less and the other wavelengths of the light sources are so determined that the common range of hues contains at least those corner points of the range of hues of the first base system whose wavelength is greater than the shortest wavelength determined by screen phosphors. The circuit is so designed that the hue of a picture point within the common range of hues is identical to the hue determined by the color value signals.

10 Claims, 3 Drawing Sheets

OTHER PUBLICATIONS

Article "Experimental Multicolor Real-Time Laser Display System", Samuel M. Stone, Proceedings of the 8th National Symposium of the Society for Information Display, May 1967, pp. 161-168.

Article "Laser Display Technology", IEEE Spectrum, Dec. 1968, pp. 39-50.

Article "Laser-Beam Recorder for Color Television Film Transfer", by Leo Beise et al, Journal of the SMPTE, Sep. 1971, vo. 80, pp. 699-703.

Article "High Quality Laser Color Television Display", by Teiichi Taneda et al, BHK Laboratories Note, Ser. No. 152, Apr. 1972, pp. 1-14.

Article "High-Quality Laser Color Television Display", by Teiichi Taneda et al, Journal of the SMPTE, vol. 82, pp. 470-474.

Article "Development of a Large Screen High Definition Laser Video Production System", by Tony Clynick, SPIE, vol. 1456, Large-Screen-Projection, Avionic, and Helmet-Mounted Displays, 1991, pp. 51-57.

Article "Laser-Based Display Technology Development at the Naval Ocean Systems Center (NOSC)", by Thomas Phillips et al, SPIE, vol. 1454, Beam Deflection and Scanning Technologies, 1991, pp. 290-298.

LASER-DRIVEN TELEVISION PROJECTION SYSTEM WITH ATTENDANT COLOR CORRECTION

BACKGROUND OF THE INVENTION a) Field of the Invention

The invention relates to a process for producing color picture points of a television picture which are illuminated with light signals of different wavelengths and whose hues are fixed by means of color value signals in a first base system which may be represented in a CIE diagram by corner points of a hue region which are defined via wavelengths of screen phosphors, and a second base system is set up in which the wavelengths of the light signals differ from those of the first base system and which shares a common range of hues with the first base system, and light signals are generated from at least three signals which are the color value signals or contain the latter by carrying out a transformation from the first base system to the second base system via a matrix. The invention is further directed to a television projection system for producing color picture points of a television picture with at least three light sources which may be controlled in intensity for light signals of different wavelengths, the hue of each picture point being fixed by color value signals in a first base system which may be represented in a CIE diagram by corner points of a hue region which are defined via wavelengths of screen phosphors, and the wavelengths of the light signals determine a second base system which differs from the first base system and has a range of hues in common with the first base system, with an input circuit for generating at least three electrical signals which are proportional to the color value signals or contain a mixture thereof, and further with a control device for controlling the light sources, which control device is triggered by the signals of the input circuit and has a circuit which can transform every hue from the first base system into the second base system via a matrix, in particular for carrying out the process mentioned above.

b) Background Art

A television projection system using such a process was described in the "Proceedings of 6th International Quantum Electronics Conference" 1970 by Yahiko Yamada, Manabu Yamamoto, and Sadao Nomura in an article entitled "Large Screen Laser Color TV Projector". Three differently colored lasers are used as light sources and are modulated by means of DKDP crystals and combined to form a common beam of light by means of a system of dichroic mirrors. This beam of light is projected on to a screen via a deflection device. The deflection device raster scans the beam of light in accordance with the picture frequency and line frequency in such a way that a color television picture is imaged on a screen.

However, this type of projected picture differs substantially from color pictures known from the television tube of a conventional color television receiver, since color television tubes produce colors by means of screen phosphors which emit a relatively broad color spectrum, whereas lasers are sources of monochromatic light. For color-correct reproduction in conventional televisions, the color sensitivity of television cameras is coordinated to the screen phosphors. In projections with a laser system, however, this leads to significant color distortions. Another cause of substantial color distortions is due to the lack of availability of laser light sources for all desirable wavelengths, so that not all of the desired hues can be produced even by a careful selection of lasers.

The article by Yamada et al. mentioned above, describes a television projection system in which a video picture is produced by means of three lasers with wavelengths 488 nm, 514 nm and 647 nm. Thus, the colors of the lasers do not conform to the colors of the NTSC video signal. Therefore, the authors of the article mentioned above suggest that the hues which can be achieved by the lasers be corrected for the hues transmitted via the NTSC standard by means of a matrix circuit. However, it is expressly noted that this only enables a restricted correction of hue.

In the book "Farbmetrik und Farbfernsehen [Chromatometry and Color Television]" by H. Lang, R. Oldenbourg Verlag, Munich/Vienna, 1978, it is stated that hues may be transformed from one base system to another base system by matrix operations. The stated preconditions enabling such transformation are essentially the existence of base systems and components for hues and the ability to represent them as vectors in coordinates x, y and z. However, it is indicated that difficulties may arise with spectral colors in which some components in the vector space are negative. Negative color components cannot be physically realized. Therefore, when negative components occur, the hue vector itself is not transformed, but rather another hue vector which is supplemented by an additional positive vector is transformed.

With the further development of television projection systems, the hue transformation was also no longer used. Thus, Teiichi Taneda et al. in "High Quality Laser Color Television Display" NHK Laboratories Note (1972), serial number 152, describe a laser projection system using wavelengths of 477 nm, 515 nm and 633 nm which, with the exception of green, are located in the vicinity of the colors according to the NTSC standard. Despite deviations of the produced hues from the NTSC colors, a color transformation is dispensed with.

Sometime later (1973), the authors describe this system again in "Journal of the SMPTE" vol. 82 page 470, without any discernable evidence of progress in the color matching.

Color transformations are also not used in later developments of large picture projection devices as can be seen, e.g. from WO A-88/01823, from "Development of a Large Screen High Definition Laser Video Projection System", Tony Clinic, SPIE, vol. 1456, "Large-Screen-Projection" Avionic and Helmet Mounted Displays, 1991, pages 51 to 57, and from "Laser-Based Display Technology Development at the Navel Ocean Systems Center (NOSC)" Thomas Phillips et al , SPIE, vol. 1454, Beam Deflection and Scanning Technologies, 1991, pages 290 to 298. Rather, the course pursued in development was to select the color of the light sources in such a way that they reproduce the colors of the screen phosphors as accurately as possible.

In order to match the laser colors to the colors of the screen phosphors as accurately as possible, dye lasers can be used, by means of which the wavelengths of the produced laser light can be shifted and their hue matched to those of the screen phosphors. However, dye lasers have only limited efficiency and this technique drastically reduces laser output. To provide a higher output would make the system extremely expensive. Substantially higher outputs would also be impossible to realize at a reasonable cost (see "Fernsehund Kino-Technik" 1974, No. 6, page 169). The toxicity of the laser-active substances presents a further disadvantage of dye lasers in that it creates serious disposal problems, chiefly because the useful life of commercial dye lasers is very limited. Nevertheless, dye lasers have been used for color shifting in laser projection systems (e.g. EP-A-0 084 434).

The selection of laser wavelengths in the article by Tony Clinic mentioned above is also effected by means of dye lasers, a wavelength between 600 and 620 nm is selected for red, a wavelength of 514.5 nm for green, and a wavelength between 457 and 488 nm is selected for blue. The hue is matched to the screen phosphor by means of a circuit in which the control signals for red, green and blue are transformed via a gamma corrector in order to achieve an acceptable range of hues for HDTV. However, it is not entirely clear how a gamma corrector, which is essentially nonlinear, can achieve an improved hue reproduction, so that it must be assumed that the hues achieved by this system also do not reproduce natural colors.

It is asserted in the book "Die Einführung des hochauslösenden Fernsehens [The Introduction of High-resolution Television]" by A. Felsenberg, Verlag Gerhard Spiehs, Kottgeisering, October 1990 (p. 26) that color reproduction for HDTV must be considerably improved. A number of suggestions are examined in this regard, including a suggestion for the use of imaginary primary colors which are restored by calculation to real colors in the receiver. However, this suggestion, i.e. to achieve improved hues by matrix transformations, is also subject to criticism in view of a risk of impaired quality due to interference.

OBJECT AND SUMMARY OF THE INVENTION

On this basis, the present invention has, as a primary object, the further development of a process of the generic type so that it permits a further improvement in the reproduction of the hues fixed in the first base system for the viewer of the television picture. Moreover, it provides a television projection system which is especially suited to carry out this process.

In a process of the above type, this object is met according to the invention in that the wavelengths of the light signals are determined in such a way that the shortest is 470 nm or less and the common range of hues contains at least those corner points of the range of hues of the first base system whose wavelengths are greater than the shortest wavelength determined by screen phosphors, and in that every hue produced by the matrix transformation within the common range of hues in the second base system is identical to the hue determined by the color value signals in the first base system.

In the process according to the invention, the wavelengths of the light signals are accordingly selected in such a way that the primary colors include the entire range of hues given by red, green and light blue to blue and mixtures thereof. Deviations are permitted only in the dark-blue regions of the CIE diagram at wavelengths less than 470 nm. However, it is precisely in this region that the human eye has poor ability to differentiate. Everyday experience teaches that the human eye has only a poor ability to distinguish hues of a very dark blue from another dark blue and often perceives it as black.

The dark-blue range in which an exact color transformation is most dispensable can be taken from the spectral brightness sensitivity curves determined by the International Commission on Illumination (CIE 1924, CIE 1951). The spectral sensitivity curves are approximately Gaussian with a Gauss width of 40 nm. The maximum of the curve is at approximately 510 nm for night vision and 560 nm for daylight vision. Thus, a viewer has good perception of colors of nighttime images only in the range of 510±40 nm. However, since all wavelengths greater than 470 nm are used in the invention for showing video images, a change in hue occurring by omission of smaller wavelengths in the process according to the invention is hardly detectable by the eye even in very dark images. In daylight, which relates to most video pictures, wavelengths less than 470 nm are perceived by the eye even with a sensitivity of only less than 10% so that the viewer can practically no longer detect incorrect representation of hues in the invention even when the hue range for wavelengths of less than 470 nm is entirely omitted.

In contrast to the prior art mentioned above, in which the green range is not encompassed by the employed laser wavelengths, although the eye is particularly sensitive to green, the present invention ensures a complete color matching precisely in this range. As a whole, a very advantageous selection of the wavelengths of the light signals is effected in the present invention resulting in a virtually optimal color matching for the eye of the viewer.

The process according to the invention uses a color transformation in which the hues are exactly transformed into a common range of hues via the matrix. The corresponding formal aspects are known from the publication by Lang, although the latter does not show how the primary colors are selected, since formal mathematics need not concern itself with the question of whether or not negative light intensities play a role in the transformation.

In the invention, the color value signals R (red), G (green) and blue (blue) are so transformed by a matrix transformation and the light signals so controlled that they reproduce the correct hue with the exception of a dark-blue hue region given by the shortest wavelength of the primary colors. By using a simple matrix transformation, the process according to the invention dispenses with expensive dye lasers for producing the same hues as those of screen phosphors. The light sources used for generating the beams of light can accordingly be used directly so that there are no power losses. Circuits for such a matrix transformation are also considerably more reliable and simpler to service than dye lasers and disposal of defective components presents only a minor problem.

Although it is predicted in "HDTV—Ein neues Medium [HDTV—a new medium]" interdisciplinary conference at the University of Constance, 1990 (page 30), that large screen end-user devices with good color and picture reproduction cannot be anticipated until the year 2000, such devices with high color accuracy can surprisingly already be built today with the process according to the invention.

In an advantageous further development of the invention, for negative intensities resulting from the matrix transformation with color signals of hues outside the common range of hues, light signals are produced with an intensity achieved from the respective negative intensity via a logarithmic asymptotic function approaching zero.

The invention is also directed to a television projection system of the type mentioned above for implementing the process according to the invention which is characterized in that the shortest wavelength of the light sources is 470 nm or less and the other wavelengths of the light sources are determined in such a way that the common range of hues contains at least those corner points of the range of hues of the first base system whose wavelength is greater than the shortest wavelength determined by screen phosphors. In so doing, the circuit for transforming every hue from the first to the second base system is designed in such a way that the hue of a picture point within the common range of hues is identical to the hue determined by the color value signals.

The television projection system according to the invention enables an advantageous implementation of the process according to the invention, the signals of the input stage being fed to a control device and processed with a matrix circuit in such a way that true hues are produced with the exception of a dark-blue hue range.

The input signals for the circuit can be the color value signals R, G and B which are transformed via matrices into required color value signals R', G' and B' for controlling the light sources. This has the advantage that the input circuit can be constructed from commercially available components and the color matching can be carried out simply by means of an additional circuit of simple construction which effects a linear transformation of the signals.

Of course, in television technology with the currently used standards PAL, NTSC and SECAM the color values of the transmission side are not transmitted directly, but rather linear combinations of these color values are transmitted and transformed into color value signals in the receiving device by another circuit whose output signals can be represented as a matrix multiplication with the input signals. A television projection system for the transformation of linear combinations of the R, G, B signals into R', G', B' signals must thus provide two circuits for transformations corresponding to a matrix multiplication.

This expenditure is reduced when the matrix multiplication, in accordance with the circuit, includes the coefficients of the matrix for the generation of the R, G, B signals and the conversion of the R, G, B signals into the R', G', B' signals so that, according to an advantageous further development, the electric signals of the input circuit include a luminance signal which is proportional to the sum of the three color value signals and two different signals proportional to the color difference signals. The luminance signal Y and the transmitted color difference signals U, V or I, Q, respectively, from which the signals for controlling the light sources are obtained are accordingly applied directly to the input of the control device.

A circuit of the type mentioned above can be realized in a particularly simple manner according to an advantageous further development of the invention in that it contains a network of resistors determining the matrix transformation. The advantage of a resistance network consists is that it is very economical, particularly if it is only necessary to realize positive matrix elements. In this case, also, no additional supply voltage is required and no particular importance need be attributed to frequency-dependent errors.

In another preferred development of the invention, an operational amplifier is provided for the circuit in the control device for each of its output signals and forms a sum for the current generated from electric signals and flowing through input resistors determined by the coefficients of the matrix. Although sum-forming operational amplifiers increase the cost of the circuitry compared with a simple resistance network, it prevents unwanted coupling between input signals. Also, the current cost of operational amplifiers is so low that the additional expenditure on circuitry is outweighed by the advantage that the input signals of the circuit can be decoupled.

The matrix and, thereby, the resistances can change depending on whether the color value signals or the luminance signal together with the color difference signals U, V (PAL standard) or I, Q (NTSC, SECAM) are used as input signals for the device. There would also be a different matrix and different resistors if other light sources were to be used, in particular lasers of different wavelengths. For this reason, a preferred further development of the invention provides for the arrangement of the input resistors of the operational amplifiers or the aforementioned network in a subassembly or component package which is connected to the rest of the circuit of the television projection system so as to be exchangeable, e.g. by plug-in contacts. Since this is generally a matter of only a few resistors (in the present examples: three input signals and three output signals, accordingly a total of nine resistors), this can preferably be arranged in a simple integrated circuit. Since this integrated circuit only involves resistors, it is preferably constructed as a thick-film circuit so that accurate resistance values can be realized in an economical manner even with small numbers of pieces.

In general, the invention can use light sources which can be easily focussed on a screen and whose intensity can be changed easily enough at frequencies in the MHz range. According to the state of the art, the most economical usable source with respect to optics is the laser. Rare-gas lasers, e.g. argon mixture gas lasers or krypton mixture gas lasers, are preferred for reasons relating to output and cost. They are statically operated and the high-frequency modulation of the light intensity is carried out with separate light modulators. However, according to an advantageous further development of the invention, the cost of additional light modulators can be avoided when semiconductor lasers or LEDs are used as light sources, since they are fast enough for direct electrical control.

There follows a more detailed description of the invention in principle by way of example with the aid of the drawings.

DESCRIPTION OF THE PREFERRED EMBODIMENTS

Figure 1:
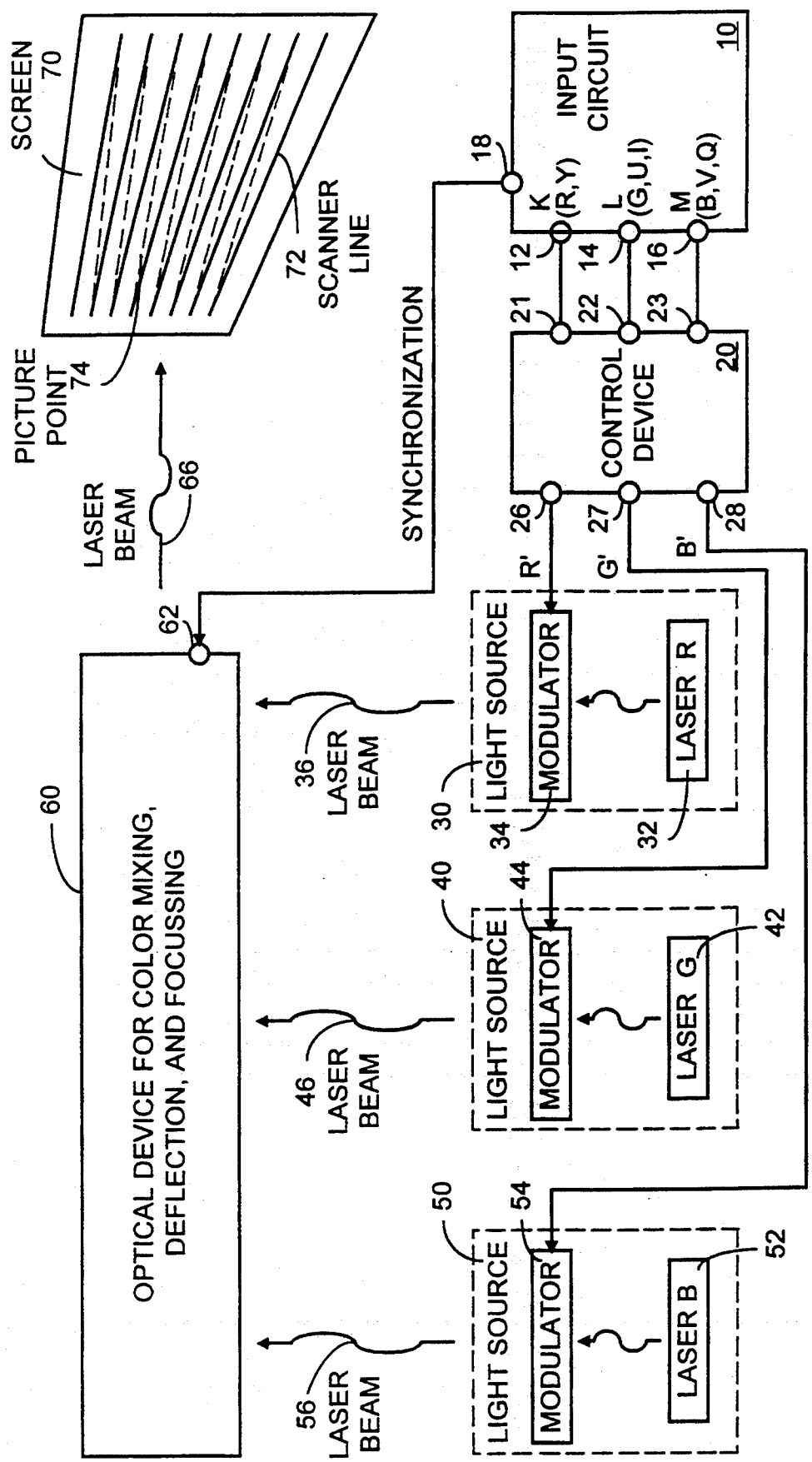
FIG. 1 shows a schematic view of a television projection system according to the invention.

In the television projection system shown in FIG. 1, three signals K, L, M are generated at outputs 12, 14, 16 in an input circuit 10 which, for example, can contain a tuner for television reception and has circuits for decoding color signals or color carrier signals. These signals K, L, M, in accordance with the prior art mentioned above, are the color value signals R, G, B commonly given off at the television tube for controlling the intensity for the three colors.

The outputs 12, 14, 16 are connected with the inputs 21, 22, 23 of a control device 20 which acts as a mixer and produces the output signals R', G', B', which are applied to its outputs 26, 27 and 28, from the input signals K, L, M. It will be explained in more detail in the following with reference to FIG. 3 how the output signals R', G', B' are formed from the inputs K, L, M.

The output signals R', G', B' at the outputs 26, 27, 28 of the control device 20 control the intensity of light beams 36, 46, 56 which are generated from light sources 30, 40, 50. In the embodiment example, the light sources 30, 40, 50 contain lasers 32, 42, 52 which work in continuous operation. The intensity of the laser light generated by the latter is altered via modulators 34, 44, 54 by means of the electric signals R', G', B'. DKDP crystals, as known from the prior art, can be used for modulation.

The three laser beams 36, 46, 56 are then fed to an optical arrangement 60 performing several functions. The first function consists in combining the three separate laser beams 36, 46, 56 to form a bundled or common laser beam. This is effected in a known manner by dichroic mirrors. The optical arrangement 60 also contains a deflecting device for the raster scanning of a television picture. The deflecting device raster scans the bundled laser beam line by line as is also known from picture tubes. The raster scanned laser beam 66 impinges on a screen 70 where a picture point 74 is imaged at the point of incidence. In FIG. 1 this raster scanning of the television picture on the screen 70 is suggested by the thinner lines.

In addition to the aforementioned functions, additional focussing devices can also be contained in the optical arrangement 60 to improve picture quality.

The deflecting device in the optical arrangement 60 includes, for example, rapidly rotating mirrors which receive a synchronization signal via a synchronization line from an output 18 of the input circuit 10 via the input 62 of the optical arrangement 60 so that the raster scanning is synchronized by the mirrors corresponding to the video signal.

The picture is formed on the screen 70 in a known manner in that the laser beam 66 is rastered on the screen 70 corresponding to the scanning in the transmitter. In so doing, the hue of a picture point 74 is given by the combined intensities of the laser beams 36, 46 and 56. Since the lasers employed in the embodiment example, in this case, argon mixture gas lasers or krypton mixture gas lasers with wavelengths 470 nm for blue, 545 nm for green, and 620 nm for red, emit different wavelengths than those of the conventional phosphors used in television, applying the RGB signals which can be produced in the input circuit directly to the modulators for the lasers with the colors red, green and blue would result in a color distortion. This color distortion is remedied by means of the control device 20 which generates new signals R', G', B' in which this color error is corrected.

Figure 2:
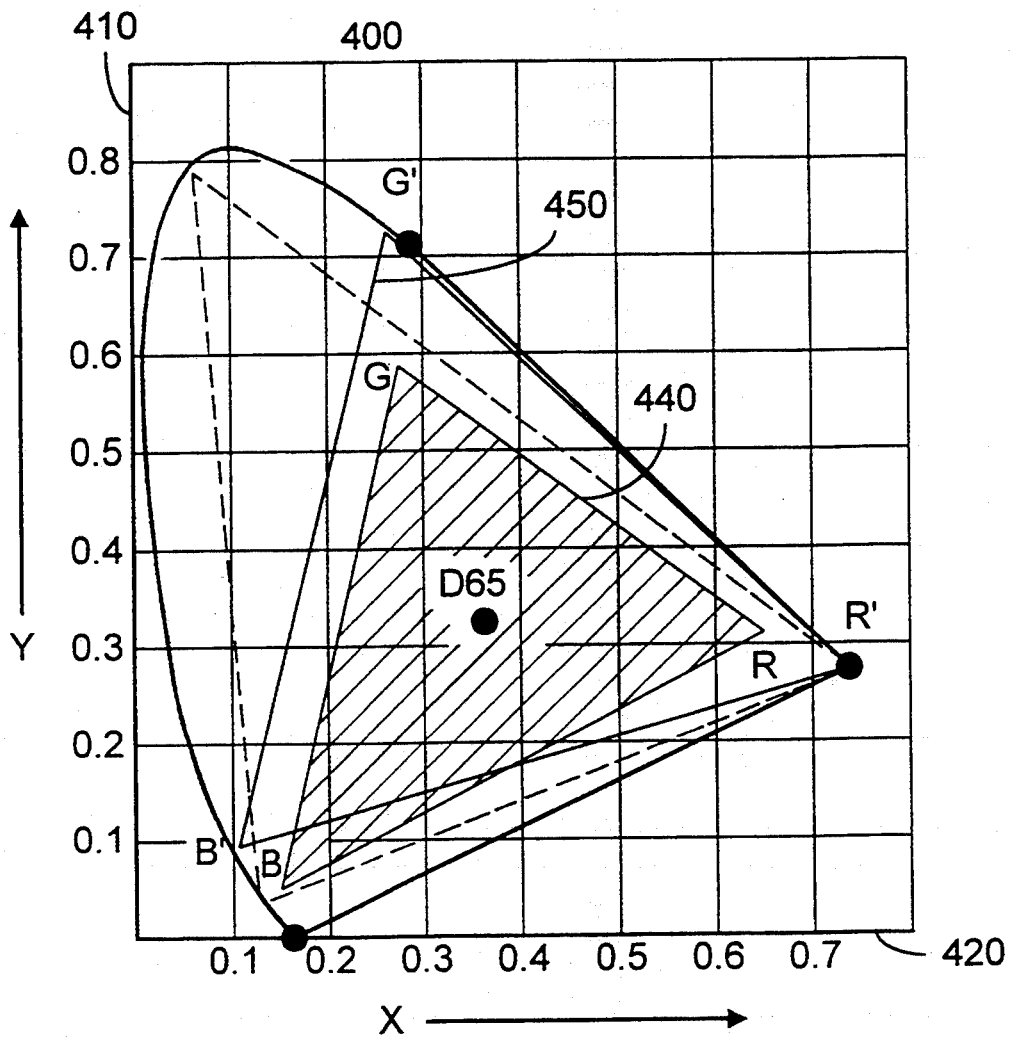
FIG. 2 shows a CIE diagram with different color triangles.

Hues can be represented as vectors in a CIE vector space whose projection on the x,y axis is shown in FIG. 2 as a CIE diagram. A transformation of the color value signals R, G, B of a first base system to the signals R', G', B' to be used according to the invention in a second base system can therefore be represented as rotation and elongation in a vector space and can be expressed mathematically as a matrix multiplication. If the input signal values of the control device 20 are designated by R, G, B and the output signal values of the control device 20 are designated by R', G', B', where the coefficients $a_{ij}$ designate the matrix elements of a transformation matrix a, this gives the following matrix multiplication:

$R' = a_{11} R + a_{12} G + a_{13} B$
$G' = a_{21} R + a_{22} G + a_{23} B$
$B' = a_{31} R + a_{32} G + a_{33} B$ or:

$$\begin{pmatrix} R' \\ G' \\ B' \end{pmatrix} = a \begin{pmatrix} R \\ G \\ B \end{pmatrix}.$$

Matrix values for the transformation of R, G, B signals for the laser wavelengths 620 nm, 545 nm and 470 nm are given in the following Table 1a.

Table 1a:

TABLE 1a

| $a_{11} = 1.24$; | $a_{12} = -0.15$; | $a_{13} = -0.09$ |
|---|---|---|
| $a_{21} = -0.09$; | $a_{22} = 1.05$; | $a_{23} = 0.03$ |
| $a_{31} = -0.02$; | $a_{32} = -0.14$; | $a_{33} = 1.16$ |

Laser light sources with wavelengths 647.1 nm for red, 514.5 nm for green, and 458.0 nm for blue are used in another embodiment example. The corresponding coefficients of the matrix are as follows (Table 1b):

TABLE 1b

| $a_{11} = 0.5677$; | $a_{12} = 0.416$; | $a_{13} = 0.0144$; |
|---|---|---|
| $a_{21} = 0.0868$; | $a_{22} = 0.8597$; | $a_{23} = 0.0543$; |
| $a_{31} = 0.0091$; | $a_{32} = 0.016$; | $a_{33} = 0.9753$. |

It will be explained in detail with reference to FIG. 3 how this transformation from the R, G, B system to the R', G', B' system is realized with respect to circuitry.

In the described example, the signals K, L, M were the color value signals R, G, B. But instead of the signals R, G, B at the inputs 21, 22, and 23, it is also possible to transform the luminance signal Y and the color difference signals U and V or I and Q directly into the color signals R', G', B'. This is explained in the PAL system by way of example. Analogous observations can be made for the NTSC and SECAM system.

In the PAL system, the R, G, B signals are generated on the basis of the following matrix multiplication:

$$\begin{pmatrix} R \\ G \\ B \end{pmatrix} = \begin{pmatrix} 1; & 0; & 1 \\ 1; & -L_B/L_G; & -L_R/L_G \\ 1; & 1; & 0 \end{pmatrix} \begin{pmatrix} Y \\ U \\ V \end{pmatrix}$$

where $L_R$; $L_G$; $L_B$ are the luminance coefficients by which the luminance signal Y is expressed by the color value signals R, G, B as $Y = L_R \cdot R + L_G \cdot G + L_B \cdot B$, where $L_R + L_G + L_B = 1$.

This gives:

$$\begin{pmatrix} R \\ G \\ B \end{pmatrix} = b \begin{pmatrix} Y \\ U \\ V \end{pmatrix},$$

where b again represents a transformation matrix.

Thus the R, G, B signals are obtained from the transmitted luminescence signal Y and the color difference signals U and V with a matrix multiplication similar to that used in the production of the R', B', G' signals from the R, G, B signals. The indicated equations now allow the following relationship:

$$\begin{pmatrix} R' \\ G' \\ B' \end{pmatrix} = (a \cdot b) \begin{pmatrix} Y \\ U \\ V \end{pmatrix}$$

This equation shows that instead of two circuits, as in the example discussed with reference to FIG. 1, for generating a signal transformation which can be represented by a matrix multiplication, an individual matrix multiplication is also possible; but the coefficients of the matrix to be used must then be taken from the product a·b. If the coefficients of the matrix in the control device 20 are determined corresponding to the matrix a·b, it is also possible to couple the device directly to the signals Y, U, V of the input circuit or, in the NTSC or SECAM system, to the signals Y, I and Q. The expenditure on circuits for a television projection system can be reduced in this way.

FIG. 2 shows another set of problems of the television projection systems. FIG. 2 shows plane color triangles in the CIE diagram. Reduced color value proportions x and y are plotted on the ordinate 410 and the abscissa 420. The curve 400 encompasses all visually detectable color stimuli (I.C.I. triangle). The large dots serve as orientation points and belong to the wavelengths 700 nm, 550 nm and 380 nm.

A shaded color triangle 440 is shown in the CIE diagram of FIG. 2 with corner points R, G, B. This represents the range of colors that can be produced with a normal screen of a color picture tube according to the EBU standard. The hues (dominant wavelength) are given by the straight connecting line from white to standard source D65 and by the corner points R, G, B with the spectrum locus, curve 400. The straight line intersects this curve at the corresponding wavelength.

Also shown in FIG. 2 is a color triangle 450 with corner points R', G', B' for the three monochromatic wavelengths 620, 545 and 470 nm as used in the example of application according to FIG. 1.

The color triangle 450 with the corner points R', G', B' indicates the range of colors which can be imaged with such a laser system. By comparing the two color triangles 440 and 450 with the corner points R, G, B and R', G', B', respectively, it can be seen that they do not completely overlap. The common range of hues is smaller in this example than the range of hues of the color triangle 440 reproducing the range of hues of the TV color primaries R, G, B. A small partial area of hues of the color triangle 440 which cannot be produced by the color triangle 450 is left over in the vicinity of point B. This partial area includes the dark-blue hues and its omission does not represent a significant impairment of color sensitivity as was already discussed.

However, an impairment of color sensitivity is avoided by using a blue laser light source whose wavelength is so small that the entire triangle R, G, B is enclosed by the resulting triangle R', G', B'. All hues of the R, G, B color triangle 440 can be simulated by a color triangle R', G', B' and an exact reproduction of the received colors is possible without the need for displacements in the blue range.

Such an improvement in the blue range can be achieved by using the Skylight 400 series lasers manufactured by the firm COHERENT, in which laser wavelengths are filtered out by means of filters BP 558 and BP 514.5 manufactured by Schott, Mainz, Germany. A krypton laser was used for red and an argon laser was used for blue and green. Wavelengths 647.1 nm for red, 514.5 nm for green and 468 nm for blue were achieved. The corresponding color triangle is also shown in FIG. 2 in dashed lines. It can be seen that this color triangle completely encloses the range of hues of the EBU phosphors R, G, B.

Figure 3:
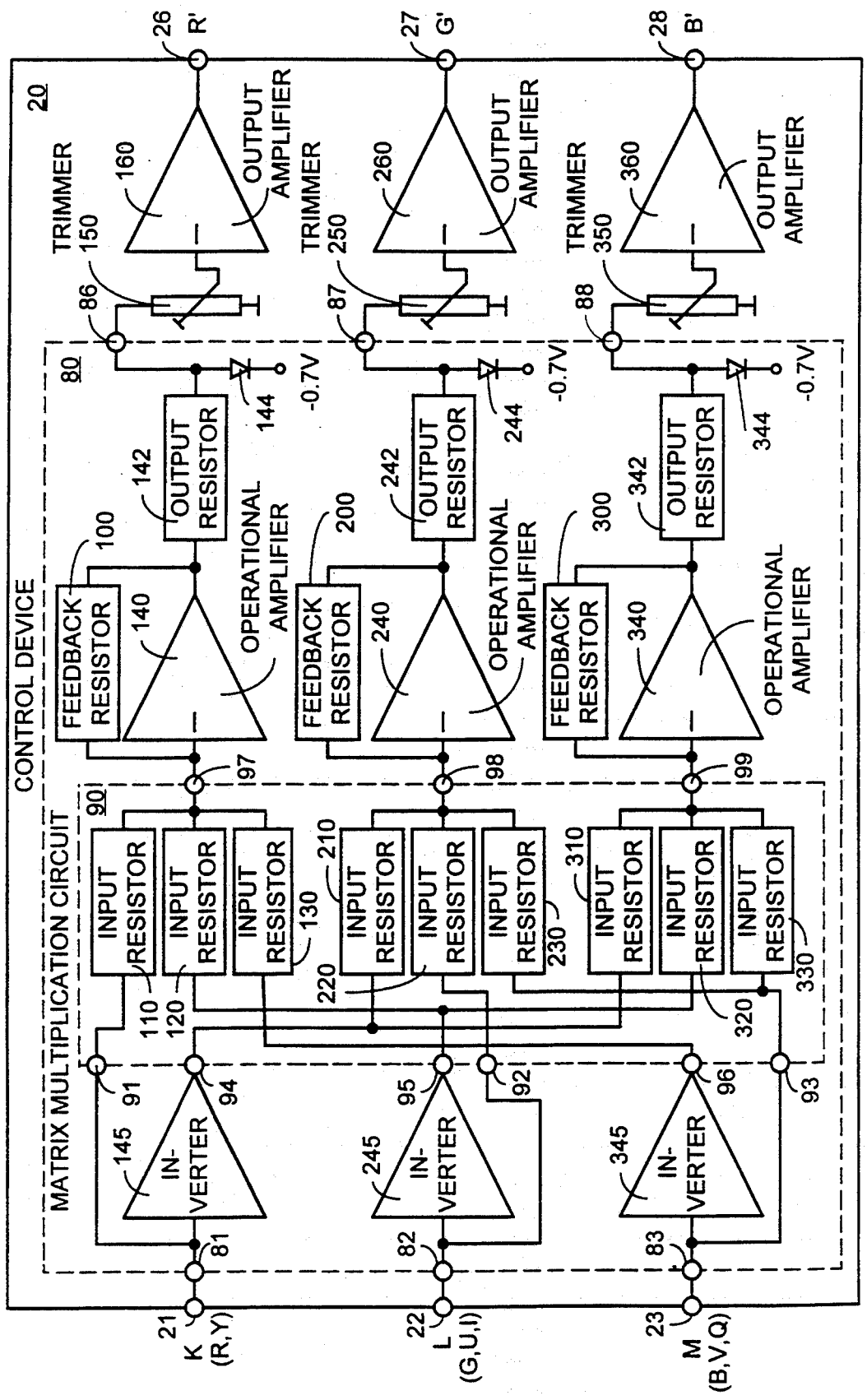
FIG. 3 shows a circuit of a device which can be used in a television projection system according to the invention.

FIG. 3 shows a circuit for a control device 20 with outputs 26, 27 and 28 and inputs 21, 22, 23. The signals K, L, M are applied to the inputs 21, 22, 23. These signals K, L, M can be the color value signals R, G, B or also the luminance signal Y and the color difference signals U and V or I and Q, depending on the television standard. The matrix multiplication is carried out in a circuit 80 whose inputs 81, 82 and 83 are connected directly with the inputs 21, 22, 23 of the control device 20 in the embodiment example shown in the drawing. The output signals occurring as a result of the matrix multiplication are tapped at the outputs 86, 87, 88 of the circuit 80 and fed to output amplifiers 160, 260, 360 via trimmers 150, 250, 350 before being applied to the outputs 26, 27, 28 of the control device 20 as signals R', G', B'. The trimmers 150, 250, 350 are provided to compensate for differences in the modulator characteristics possibly arising in series manufacture of a television projection system.

The actual matrix multiplication for the signals is carried out by the operational amplifiers 140, 240, 340. The latter are degeneratively coupled from the output to an inverting input of the operational amplifiers 140, 240, 340 with negative-feedback or degenerative resistors 100, 200 and 300. Three additional resistors 110, 120, 130; 210, 220, 230; 310, 320, 330 are connected to each degeneratively coupled inverting input of the operational amplifiers 140, 240, 340. Due to this connection, every operational amplifier 140, 240, 340 works as an adder, the input signals at the resistors 110, 120, 130; 210, 220, 230; 310, 320, 330 being multiplied by coefficients of ratios of resistance values before adding. The numerical resistance ratios are to be equated with the absolute values of the coefficients for the matrix multiplication indicated in Table II:

Table II:

Resistance value 100/resistance value 110 = $/a_{11}/$
Resistance value 100/resistance value 120 = $/a_{12}/$
Resistance value 100/resistance value 130 = $/a_{13}/$
Resistance value 200/resistance value 210 = $/a_{21}/$
Resistance value 200/resistance value 220 = $/a_{22}/$
Resistance value 200/resistance value 230 = $/a_{23}/$
Resistance value 300/resistance value 310 = $/a_{31}/$
Resistance value 300/resistance value 320 = $/a_{32}/$
Resistance value 300/resistance value 330 = $/a_{33}/$.

However, some of the coefficients in the matrix elements indicated in the embodiment example according to FIG. 1 are negative. Therefore, not all resistors 110, 120, 130, 210, 220, 230, 310, 320, 330 can be coupled directly to the inputs 81, 82, 83. Three inverters 145, 245 and 345 are provided to simulate mathematical sign reversal. These inverters 145, 245 and 345 invert the signals at the inputs 81, 82, 83 of the circuit 80 before they are given to the summing network formed by the resistors 110, 120, 130, 210, 220, 230, 310, 320 and 330. As can be seen from FIG. 3, the inputs of the resistors 110, 120, 130, 210, 220, 230, 310, 320 and 330 are connected with the signals R, G, B at the inputs 21, 22, 23 of the control device 20 corresponding to the sign of the matrix elements mentioned above. In the embodiment example, the same resistance values of 1 k Ω were selected for the degenerative resistors 100, 200 and 300. Accordingly, the following resistance values are used in the embodiment example to realize the matrix according to Table 1a:

TABLE III

| Resistor | Value |
|---|---|
| 110 | 1 kΩ |
| 120 | 8.16 kΩ |
| 130 | 13.74 kΩ |
| 210 | 14.62 kΩ |
| 220 | 1.18 kΩ |
| 230 | 43.67 kΩ |
| 310 | 55.25 kΩ |
| 320 | 9.05 kΩ |
| 330 | 1.07 kΩ. |

The resistance values for the laser wavelengths serving as a basis for Table 1b can be calculated in a corresponding manner, but it must be taken into account that the input signals in this case are not to be inverted, since all coefficients are positive.

The output signals of the operational amplifiers 140, 240, 340 are applied via output resistors 142, 242 and 342 to the outputs 86, 87, 88 of the circuit 80. In the embodiment example shown in the drawing, the output resistance values 142, 242, 342 are 51 Ω, matching a 50 Ω video system. Also, a diode 144, 244, 344 is connected at every output against a potential of 0.7 volts. These diodes 144, 244, 344 suppress possible output voltages of the operational amplifiers with unwanted polarity (positive in this case). The diodes 144, 244, 344 are connected against a potential of −0.7 volts so as to enable suppression also of small potentials below the threshold voltage of the diodes 144, 244, 344. In this example, the diodes 144, 244, 344 are silicon diodes whose threshold voltage corresponds precisely to the 0.7 volt bias voltage. With other diodes, a corresponding potential must be selected. In germanium diodes, for example, a voltage of roughly 0.2 V is selected as counterpotential instead of 0.7 volts.

Diodes generally have an exponential I/U characteristic and, in the event of small signals at the diodes, a voltage drop occurs with a logarithmic curve with respect to the output voltage of the respective operational amplifier. Thus, given an appropriate selection of diodes 150, 250, 350, dropping resistors 142, 242, 342 and potential, the voltage drop approaches zero as a logarithmic asymptote at output voltages of undesirable polarity. Such unwanted polarities occur when the transformed hue is not located in the common range of hues. Compared with the suggestion by Lang where the separation point is exactly zero (see the introductory part of the specification) a logarithmic separation has the advantage that hue changes outside the common range of hues are also represented, that is, contrasts can still be recognized.

In order to determine the asymptotic behavior, the selected potential must be equal to the threshold voltage of the diodes 150, 250, 350. The value of the dropping resistors 142, 242, 342 determines the logarithmic curve as a function of the input voltage. When the selected resistors 142, 242, 342 have very low impedance, as in this example 51 Ω, the logarithmic curve of the voltage drop first occurs at very low voltages as a function of the output voltage of the respective operational amplifier 140, 240, 340 so that the transformation of the hues provides the true hues realizable by the phosphors practically up to the boundaries of the entire range of hues.

The control device 20 can be operated with signals other than the R, G, B signals used in the example, e.g. the luminance signal Y and the color difference signals U, V or I, Q. However, the matrix would then change, that is, not only the values of the coefficients, but also their individual signs would change. This means that the resistors 110, 120, 130, 210, 220, 230, 310, 320, 330 must be selected differently in a corresponding manner and connected to the inputs and outputs of the inverters 145, 245 and 345 differently than in FIG. 3.

In the embodiment example, by way of a simple change in the circuit 80, the resistors 110, 120, 130, 210, 220, 230, 310, 320, 330 determining the coefficients are contained in a special component package 90 which can be plugged into the circuit 80 via plug-in contacts 91, 92, 93, 94, 95, 96, 97, 98, 99. The plug-in contacts 97, 98, 99 are outputs of the component package 90 which are directly connected to the degeneratively coupled inputs of the operational amplifiers 140, 240, 340. The plug-in contacts 91, 92, 93 are provided for the input of the signals from the inputs 81, 82, 83 of the circuit 80, whereas the inputs 94, 95, 96 guide the corresponding inverting signals into the component package 90. The component package 90 can accordingly be furnished with different resistors for different coefficients and connected to the inputs 91, 92, 93, 94, 95, 96 in a different manner corresponding to the mathematical signs of the coefficients for the matrix multiplication. The component package 90 can accordingly be exchanged for different applications. Thus, it is easy to correct displacements of the chromaticity coordinates or color value proportions of the three optical channels. Such displacements are caused by the selective transmission characteristics of the optical structural component parts connected downstream of the lasers, or by other lasers.

For the purpose of standardization it is possible to construct the component package 90 as an integrated circuit, particularly with the use of thick-film technique, since a sufficiently high accuracy for the resistance values can be achieved with the use of this technique.

Two argon mixture gas lasers and a krypton mixture gas laser with filters or dye lasers for adjusting the desired wavelengths generated by three light signals $R_L'$, $G_L'$, $B_L'$ are used in the embodiment example described above. However, the intensity of the argon or krypton mixture gas lasers cannot be directly controlled fast enough to produce a television picture. For this reason, such laser light sources 32, 42, 52 are normally operated in continuous wave mode and the intensity is controlled separately by modulators 43, 44, 54. However, it is anticipated that semiconductor lasers having correspondingly selectable wavelengths will soon be available, so that they can also be utilized for realizing a laser projection system. Such semiconductor lasers could then be directly controlled.

However, usable light sources are not restricted to lasers. On the contrary, all light sources which allow good focussing and can be raster scanned for a television picture can be used in principle. Even optional light sources which determine a correspondingly large color triangle via their wavelengths according to the teaching of claim 1 can be used, their control signals being combined in such a way that a color-correct reproduction is ensured.

It is also conceivable to use four or more lasers to increase the color quality. The additional signals required for this can also be produced by a control device 20 corresponding to a matrix multiplication. The circuit 80 can be modified by additional operational amplifiers and input resistors for the additional signals in a manner analogous to the example according to FIG. 3.

While the foregoing description and drawings represent the preferred embodiments of the present invention, it will be obvious to those skilled in the art that various changes and modifications may be made therein without departing from the true spirit and scope of the present invention.

What is claimed is:

1. In a process for generating color picture points of a television picture which are illuminated with light signals ($R_L'$, $G_L'$, $B_L'$) of different wavelengths and whose hues are fixed by means of color value signals (R, G, B) in a first base system which may be represented in a CIE diagram by corner points of a hue region which are defined by way of wavelengths of screen phosphors, in which process a second base system is derived in which the wavelengths of the light signals (RL', GL', BL') differ from those of the first base system and which shares a common range of hues with the first base system, and in which process light signals are generated from at least three signals (K, L, M) which are the color value signals (R, G, B) or contain said color value signals by way of a transformation from said first base system into said second base system using a matrix, the improvement comprising the steps of:
    determining the wavelengths of the light signals (RL', GL', BL') so that the shortest is 470 nm or less and so that the common range of hues contains at least those corner points of the range of hues of the first base system whose wavelength is greater than the shortest wavelength determined by screen phosphors; and
    assuring that every hue produced by the matrix transformation within the common range of hues in the second base system is identical to the hue determined by the color value signals in the first base system.

2. The process according to claim 1, wherein, for negative intensities resulting from the matrix transformation for color signals of hues outside the common range of hues, the process includes the step of producing light signals with an intensity achieved from the respective negative intensity via a logarithmic asymptotic function approaching zero.

3. In a television projection system for generating color picture points of a television picture using at least three light sources which may be controlled in intensity for developing light signals ($R_L'$, $G_L'$, $B_L'$) of different wavelengths, wherein the hue of each picture point is fixed by means of color value signals (R, G, B) in a first base system which may be represented in a CIE diagram by corner points of a hue region which are defined via wavelengths of screen phosphors, and wherein the wavelengths of the light signals ($R_L'$, $G_L'$, $B_L'$) determine a second base system which differs from the first base system and which shares a common range of hues with the first base system, having an input circuit for generating at least three electric signals (K, L, M) which are proportional to the color value signals or contain a mixture thereof, having a control device for controlling said light sources, said control device capable of being triggered by the signals (K, L, M) of the input circuit and having a transformation circuit for transforming every hue from the first base system into the second base system via a matrix, the improvement comprising:
    that the shortest wavelength of said light sources is 470 nm or less, the other wavelengths of said light sources being such that the common range of hues contains at least those corner points of the range of hues of the first base system whose wavelength is greater than the shortest wavelength determined by screen phosphors, and said transformation circuit includes means for assuring that the hue of a picture point within the common range of hues is identical to the hue determined by the color value signals.

4. The television projection system according to claim 3, wherein the electric signals of the input circuit include a luminance signal which is proportional to the sum of the three color value signals and two different signals proportional to the color difference signals.

5. The television projection system according to claim 3, wherein said transformation circuit includes a network of resistors for determining the matrix transformation.

6. The television projection system according to claim 5, wherein said transformation circuit includes an operational amplifier for each of its output signals, said operational amplifier forming the sum of the current generated by electric signals (K, L, M) and passing through said network of resistors determining the matrix transformation.

7. The television projection system according to claim 6, wherein said network of input resistors is arranged so as to be exchangeable in said transformation circuit.

8. The television projection system according to claim 3, wherein said light sources are lasers having light modulators, and wherein the light intensity of the light sources can be varied by electrical control of the light modulators.

9. The television projection system according to claim 3, wherein said light sources are semiconductor lasers.

10. The television projection system according to claim 3, wherein said light sources are LEDs.

* * * * *